United States Patent
Nørgaard Johansen et al.

(10) Patent No.: US 11,711,035 B2
(45) Date of Patent: Jul. 25, 2023

(54) EXERCISE MACHINE WITH A VARIABLE LOAD PROVIDED BY AN ELECTRIC MOTOR

(71) Applicant: Kompan A/S, Odense SØ (DK)

(72) Inventors: Martin Nørgaard Johansen, Skårup Fyn (DK); Andy Husted, Odense N (DK)

(73) Assignee: Kompan A/S, Odense SØ (DK)

( * ) Notice: Subject to any disclaimer, the term of this patent is extended or adjusted under 35 U.S.C. 154(b) by 348 days.

(21) Appl. No.: 17/045,967

(22) PCT Filed: Apr. 8, 2019

(86) PCT No.: PCT/DK2019/050109
§ 371 (c)(1),
(2) Date: Oct. 7, 2020

(87) PCT Pub. No.: WO2019/196997
PCT Pub. Date: Oct. 17, 2019

(65) Prior Publication Data
US 2021/0361994 A1    Nov. 25, 2021

(30) Foreign Application Priority Data

Apr. 8, 2018 (DK) .............................. PA201870205

(51) Int. Cl.
*H02P 7/29*       (2016.01)
*H02P 3/12*       (2006.01)
(52) U.S. Cl.
CPC ............ *H02P 7/29* (2013.01); *A63B 2220/34* (2013.01); *A63B 2220/58* (2013.01); *H02P 3/12* (2013.01)

(58) Field of Classification Search
CPC .......... H02P 7/29; H02P 3/12; A63B 2220/34; A63B 2220/58; A63B 22/0605;
(Continued)

(56) References Cited

U.S. PATENT DOCUMENTS

| 4,941,652 A | 7/1990 | Nagano et al. |
| 5,205,801 A | 4/1993 | Haner |

(Continued)

FOREIGN PATENT DOCUMENTS

| EP | 0736311 B1 | 10/1996 |
| JP | H0542232 A | 2/1993 |

(Continued)

OTHER PUBLICATIONS

Danish Search Report dated Oct. 26, 2018 in Danish Patent Application No. PA 201870205 (4 pages).

(Continued)

*Primary Examiner* — David Luo
(74) *Attorney, Agent, or Firm* — Bookoff McAndrews, PLLC

(57) ABSTRACT

An exercise machine comprises a user force input element, a transmission unit, an electric motor, and an electrical circuit connected to the electric motor. The user force input element is connected to the electric motor via the transmission unit such that said electric motor turns at an angular velocity which is different than the velocity or angular velocity of the user force input element. The motor runs as a generator such that when the electric motor is turned, an electrical current is developed in the electrical circuit. The electrical circuit comprises an electrical resistor, a switching element, a Pulse Width Modulation (PWM) controller, and a load reference controller.

11 Claims, 1 Drawing Sheet

(58) Field of Classification Search
CPC .............. A63B 21/225; A63B 21/0058; A63B 21/0053; A63B 21/0055
USPC ........................................ 318/759, 757, 727
See application file for complete search history.

(56) References Cited

U.S. PATENT DOCUMENTS

| | | | |
|---|---|---|---|
| 5,256,115 A | 10/1993 | Scholder et al. | |
| 5,462,503 A | 10/1995 | Benjamin et al. | |
| 6,626,805 B1 | 9/2003 | Lightbody | |
| 7,094,184 B1* | 8/2006 | Chen | A63B 21/0053 73/379.06 |
| 7,862,476 B2* | 1/2011 | Blau | A63B 21/0051 482/8 |
| 2003/0073546 A1 | 4/2003 | Lassanske et al. | |
| 2009/0111658 A1 | 4/2009 | Juan | |
| 2010/0090475 A1 | 4/2010 | Tsai et al. | |
| 2011/0118086 A1 | 5/2011 | Radow et al. | |

FOREIGN PATENT DOCUMENTS

| | | |
|---|---|---|
| WO | 2008/136588 A1 | 11/2008 |
| WO | 2010/011051 A2 | 1/2010 |
| WO | 2016/076708 A2 | 5/2016 |
| WO | 2016/156590 A1 | 10/2016 |
| WO | 2016/172103 A1 | 10/2017 |

OTHER PUBLICATIONS

International Search Report and Written Opinion dated Jun. 19, 2019 in counterpart International Patent Application No. PCT/DK2019/050109 (9 pages, in English).

* cited by examiner

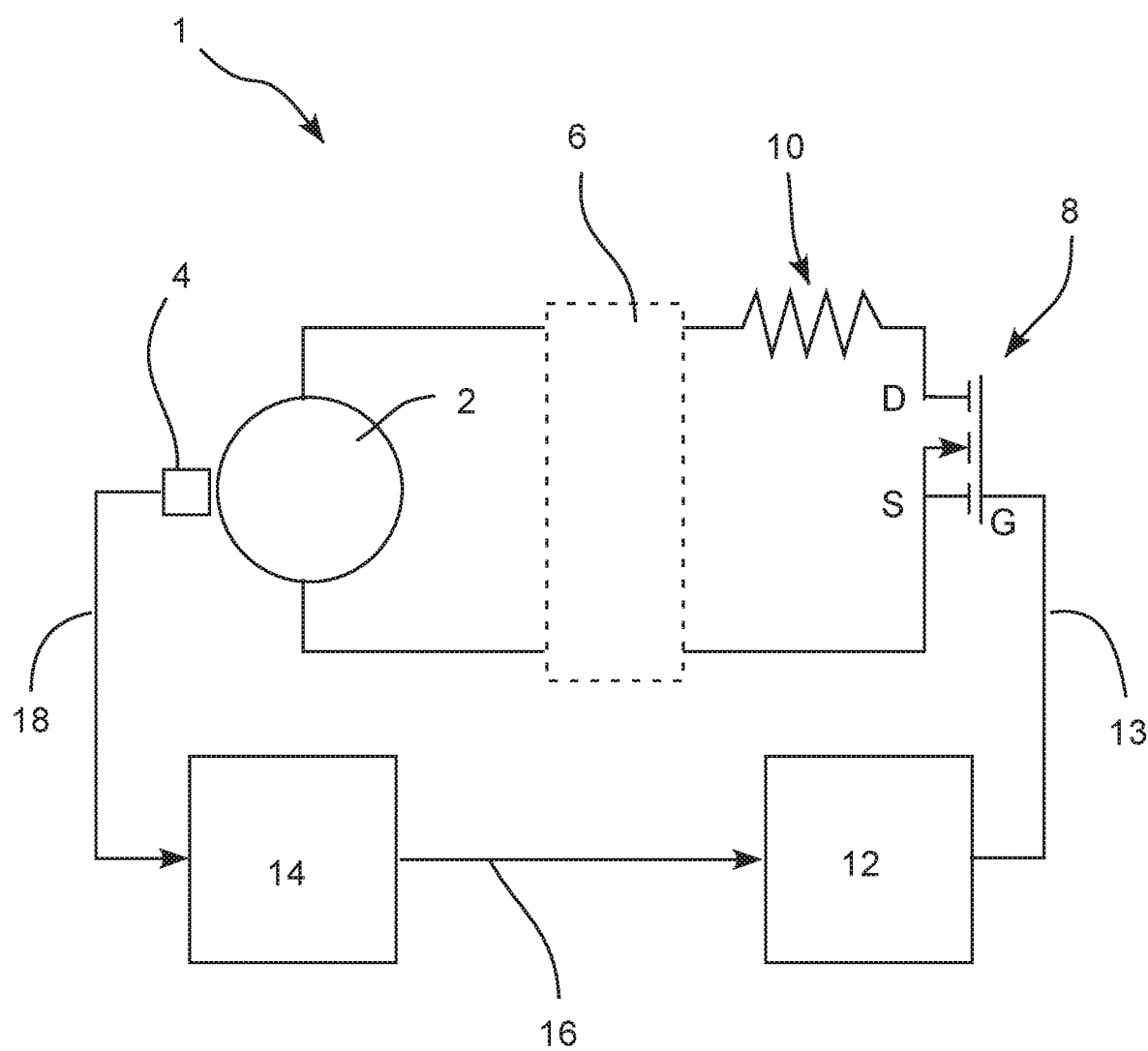

EXERCISE MACHINE WITH A VARIABLE LOAD PROVIDED BY AN ELECTRIC MOTOR

CROSS-REFERENCE TO RELATED APPLICATION(S)

This patent application is a national stage entry of International Patent Application No. PCT/DK2019/050109, filed on Apr. 8, 2019, which claims the benefit of priority to Danish Patent Application No. PA201870205, filed on Apr. 8, 2018.

The current invention relates to an exercise machine comprising a user force input element, for example a set of bicycle pedals, a transmission unit, an electric motor, and an electrical circuit connected to the electric motor. The user force input element is connected to the electric motor via the transmission unit such that said electric motor turns at an angular velocity which is different than the velocity or angular velocity of the user force input element and the motor runs as a generator such that when the electric motor is turned, an electrical current is developed in the electrical circuit.

DESCRIPTION OF RELATED ART

In exercise machines, it is common to have a load against which the user works while expending energy. In certain cases, there is an inertial or gravitational load which the user needs to displace. In other cases, there is a frictional load which the user needs to work against. In certain cases, there is a combination of frictional and inertial loads.

In most prior art systems, the load is provided by one or more mechanical elements, for example a large mass against which the user works or a mechanical friction device or a combination of a mass and a frictional element. However, attempts have also been made to use electrical devices as loads. For example running an electrical motor as a generator acting against an electrical load has been used in different systems. One example is provided in US 2003073546 which discloses using an AC motor connected to a resistive load which is switched on and off via a PWM circuit to control the load on an indoor bicycle trainer system. In US 2003073546, the rear wheel of a normal bicycle is fixed to the trainer to drive the AC motor and the load provided by the AC motor to the wheel is controlled by the PWM circuit.

This type of prior art bicycle trainer system generally controls a relatively slowly varying load to simulate varying changes in the load that a bicycle might experience while driving along a path. These prior art bike fitness systems are not designed to react to fast load changes or to control the load at specific locations around the trajectory of the pedals.

Certain forms of exercise machines require a faster rate of control. One example is disclosed in U.S. Pat. No. 5,256,115 where a power transistor is used to control the flow of current through a resistor driven by a DC motor. Another example is disclosed in U.S. Pat. No. 7,862,476 where the field voltage of a three phase AC generator connected to three fixed resistances is controlled via a PWM circuit to vary the load on the system. However, using these prior art systems has shown to either be limiting on the amount of power which can be dissipated efficiently or has been limited to situations where energy is consumed in the electrical motor which limits the effective life time of the electrical motor. For example in the case of U.S. Pat. No. 5,256,115 the power consumption is limited to 50-100 watts which is very low for a fitness machine.

SUMMARY OF THE INVENTION

Hence a first aspect of the current invention is to provide an exercise machine as mentioned in the introductory paragraph which is more efficient than the prior art systems and which can dissipate more energy as well as allowing a very fast regulation so that the load can be varied precisely at a fast sample rate so that the load can be controlled at specific locations of a trajectory of a user force input element.

This aspect is provided by an exercise machine as mentioned in the introductory paragraph and where the electrical circuit comprises a switching element, a Pulse Width Modulation (PWM) controller, a load reference controller and an electrical resistor, where the electrical resistor is connected to the electric motor via the switching element such that when the switching element is switched on and off, the electrical resistor is electrically connected and disconnected respectively from the electric motor, where the switching element is controlled via the PWM controller to change the amount of time the resistor is connected to the motor, where the PWM controller has a switching frequency greater than or equal to 200 Hz and where the load reference controller controls the PWM controller by sending a load reference to the PWM controller, said load reference controller having a sampling frequency of greater than or equal to 200 Hz. In this way, a smooth and effective control can be applied to the user force input element to provide an effective workout to the user without the need for large mechanical loads. This results in a cheaper and more flexible exercise machine. For example, the load can be adjusted very quickly without having to change mechanical components. Also different types of mechanical loads can be simulated in an easy manner.

Providing the load as a PWM controlled resistance, allows the resistance to be placed at a location which is optimized both from a placement and/or cooling perspective. For example, the motor can be placed hidden inside the frame of the exercise machine at a location which optimizes the loading of the motor. However, the resistance can be placed at a location which is otherwise optimized. For example the resistance can be mounted to a frame component which is located on the outside of the frame so that heat generated in the resistor can be dissipated through the surface of the frame component to which the resistance is connected. Many flexible options are provided by decoupling the load resistance from the motor itself.

In one embodiment, the electric motor could be a DC Motor. Using a DC motor has a big advantage in that the DC motor is very efficient and generates very low amounts of heat which prolongs its lifetime. Furthermore, implementing a fast control on a DC motor is also easy.

In one embodiment, the PWM switching frequency is greater than or equal to 350 Hz, greater than or equal to 400 Hz or greater than or equal to 500 Hz.

In one embodiment, the sampling frequency of the load reference controller is greater than or equal to 350 Hz, greater than or equal to 400 Hz, or greater than or equal to 500 Hz.

In one embodiment of exercise machine, the load reference controller can calculate the load reference based on a velocity difference between the measured velocity of the user force input element and a virtual velocity. It should be noted that the term "measured velocity of the user force input element" should be understood in that it is either measured directly or it could also be derived based on a measurement of a directly connected component. In one embodiment, the measured velocity of the user force input element could be calculated based on the known relationship between the pedal speed and the rotation of the electric motor shaft based on the gear transmission unit between the pedals and the electric motor.

In one embodiment, the measured velocity of the user force input element could be calculated based on the output of a digital encoder connected to a shaft of the electric motor. This is a solution which can give a high resolution and a signal with low signal noise.

In one embodiment the virtual velocity could be calculated based on a function of the measured velocity of the user force input element. For example, the measured velocity could be used as an input to a model of a physical system. In one embodiment, the virtual velocity could be based on a model of a virtual inertial flywheel or another virtual system comprising an inertial load.

In one embodiment the virtual velocity takes into account virtual frictional type loads. For example wind loads, road friction loads, mechanical frictional loads, etc.

In one embodiment, the user force input element can be arranged to have a circular motion and the angular velocity of the electric motor could be greater than the angular velocity of the user force input element due to the gearing in the transmission unit. In this way, a higher precision can be implemented in the load control since the electric motor will turn faster than the pedals and low resolution changes in the rotational load of the electric motor will be reflected more precisely in the rotational load of the pedals.

In one embodiment, the exercise machine could be an exercise bike and the user force input element could be a set of pedals. In one embodiment, the exercise machine is a cross trainer and the user force input element is a set of foot input elements and/or a set of arm force input elements. In one embodiment, the exercise machine could be a weight lifting simulation machine. In one embodiment, the exercise machine could be rowing machine and the user force input element is a handle on a rope which is pulled by the user.

In one embodiment, the load reference controller could generate a load reference based at least in part on the actual force applied to the user force input element. In one embodiment, the actual applied force could be estimated based on the known load exerted by the electric motor and the change in velocity of a rotating shaft of the electric motor. It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 1 shows an electrical circuit schematically illustrating one embodiment of the invention.

In the following, the invention will be described in greater detail with reference to the embodiment shown by the enclosed figures. It should be emphasized that the embodiment shown is used for example purposes only and should not be used to limit the scope of the invention.

DETAILED DESCRIPTION OF THE EMBODIMENTS

FIG. 1 shows a schematic illustration of the main components of one embodiment 1 of an electrical circuit according to the current invention.

In this embodiment, the example of an exercise bike (not shown) is used. The exercise bike comprises a frame having a seat, handle bars and a set of pedals in a traditionally known setup. A user can sit on the seat, hold the handle bars and turn the pedals with his or her feet.

The pedals are connected to an electrical DC motor 2 via a mechanical gear transmission unit. The DC motor is a standard DC motor and the mechanical gear transmission unit is a standard gear transmission unit and they will therefore not be described in more detail in this specification. The person skilled in the art of mechanical systems will be able to provide a suitable transmission unit and a suitable DC motor. As a concrete example of a gearing ratio, in the current embodiment, a gear ratio of around 18.6 is used. In other words the electrical motor turns 18.6 times faster than the pedal speed. Other gearings could also be used.

A digital encoder 4 is connected to a main shaft of the DC motor. As the main shaft turns, the digital encoder emits pulses as is known to the person skilled in the art of sensors. In the current embodiment, the encoder emits 1,000 pulses per revolution of the encoder. As such, the encoder emits 18,600 pulses per single revolution of the pedals. Other encoders could also be used. The higher the number of pulses, the better the resolution of the position signal will be. By counting the number of pulses, the change in position of the pedals can be calculated. Since we know that there are 18600 pulses per revolution of the pedals, we know that every 18600 pulses, the pedals will have travelled one revolution.

By comparing the encoder counter value at specific time intervals, the velocity of the pedals can be calculated. For example, if there is a sample period of 2 ms and we measure a difference in encoder count of 3 pulses, then we know we have travelled 3 pulses/2 ms, which means a travel of 1500 pulses/second. Since 1 revolution is 18600 pulses, we know that we have travelled 1500/18600 or approximately 0,0806 revolutions/second or approximately 4.8 RPM.

In this way, the velocity of the pedals can be easily and precisely determined without significant electrical signal noise. Other forms of position or velocity sensors could also be used with benefits and/or disadvantages as will be known to the person skilled in the art of sensors. For example a potentiometer could be used and the derivative of the signal could be used as an indication of the velocity. However, this signal will have more signal noise. When using an encoder, the actual position of the pedals is not known precisely since the encoder typically does not have absolute position information when started. However, the encoder could be combined with a sensor which measures absolute position of the pedals. This could also be a sensor which detects when the pedals pass a specific location. This could then be used to reset the position signal from the encoder which can thereafter be used to determine the actual position of the pedals.

The electrical motor in this embodiment is further connected to motor protection circuitry 6. This type of protection circuitry is known to the person skilled in the art of electrical motors. This motor protection circuitry protects the motor from electrical damage if the electrical load, as described below, is quickly turned on or off. Furthermore, the motor protection circuitry could comprise suitable filtering elements to provide a smoother load on the motor. Such filtering elements will be known to the person skilled in the art of electrical motor drives and circuits.

The electrical motor is then connected to a switching element 8, which in this case is a MOSFET. The switching element has two states, either on or off. In this way, the switching element is very efficient and does not consume much energy or generate much heat. The switching element is then connected to a load resistor 10. In the current embodiment, the load resistor has a value of 0.6 Ohm and has a power rating of around 600 W. When the switching element is on, then the current generated by the DC motor passes through the load resistor 10. When the switching element is off, then the current generated by the DC motor does not pass through the load resistor. In the case where the switching element is off, any current generated by the DC motor passes through the motor protection circuitry. The motor protection circuitry is therefore arranged to provide very low load to the DC motor when the load resistor is not connected to the DC motor. The switching element 8 in this embodiment is controlled by a PWM controller 12 which in the current embodiment has a switching frequency of 1 kHz. That is to say that the period of the pulse generated by the PWM controller is around 1 ms. When full load is to be applied to the DC motor, then the PWM signal 13 has a duty cycle of 100% and the load resistor is therefore connected to the motor 100% of the time. When a load of 50% is to be applied to the DC motor, then the duty cycle of the PWM signal will be 50% and the resistor is only connected to the motor 50% of the time. This leads to a reduction in the force experience by the user. By using a high PWM frequency, the load connected to the motor can be adjusted very quickly and smoothly. Specific details of PWM signals are not provided here as the person skilled in the art of electrical circuits will be familiar with the concept of PWM control.

The higher the switching frequency, the smoother the motion of the motor will feel and the better the resolution will be to control the motor load at different positions along the pedal trajectory. However, the higher the switching frequency, the more energy will be consumed in the switching element and the more heat will be generated in the switching element. Therefore a compromise is to be made when choosing the switching frequency. A lower end of the switching frequency is around 200 Hz where values below 200 Hz will generate a force ripple which will be noticed by the user during rotation of the pedals.

The PWM controller 12 is controlled by the load reference controller 14. The load reference controller calculates how much load the DC motor should apply to pedals. This signal will typically be in the range of 0% to 100% load where 100% load is the max load which can be applied by the DC motor. The actual load reference 16 is dependent on the type of exercise machine which is needed. In a case of an exercise machine where the user needs to act against a fixed load, for example a linear bench press machine, the load reference controller can develop a fixed load reference which is sent to the PWM controller and the DC motor will generate a fixed load. In other cases, the load could be dependent on a position of the user force input element. The load reference controller could therefore use as one input, the position of the user force input device and adjust the load reference sent to the PWM controller based on the position of the user force input device.

In the current embodiment of the exercise bike, the load is made dependent on the rotational velocity of the pedals and as such the load reference controller uses as one input, the measured velocity 18 of the pedals. Instead of using the actual measured velocity of the pedals, in this embodiment, the velocity of the pedals is calculated based on the DC motor shaft speed and the gear ratio of the transmission unit. While there is some form of transfer function between the pedal speed and the motor shaft speed, in this embodiment, it is assumed that the transfer function will be pretty close to a constant value equal to the gear ratio of the transmission unit. However, in cases where there is a more significant difference, due to for example an elasticity in the transmission unit, a more complex transfer function could be used to calculate the velocity of the pedals. A person skilled in the art of modelling and control theory will be able to help with defining a suitable function.

In all bikes, exercise bikes included, a user cannot apply a constant torque to the pedals since the pedals rotate about a fixed point thereby changing the lever arm effect of the pedal crank arm as the pedals rotate. In the position where the pedals are essentially horizontal, the user will be able to apply a high force and in the case where the pedals are essentially vertical, the user will apply essentially zero force. If the resistive load applied to the pedals by the exercise bike was constant, then this would be very difficult for the user to pedal. In actual fact, the load applied by the user will have an essentially sinusoidal shape.

In most exercise bikes, a form of mechanical inertial flywheel will be used to even out the load force. The user starts by applying a force which gets the flywheel turning. If the user applies more force to the pedals, the flywheel will accelerate and as the user decreases the force on the pedals, the flywheel will decelerate due to the frictional load in the system. However, in the case where the user reaches the bottom or top portion of the pedal stroke and the actual input force by the user will be zero, the system will continue to turn due to the inertial effects of the flywheel. This will provide a smoother load to the user.

Since mechanical flywheels are complicated and expensive, the exercise bike of the current system varies the load exerted by the DC motor to even out the load forces applied to the pedals. In this way, a mechanical flywheel can be avoided.

In one embodiment of the load reference controller, the load reference will be determined based on a difference between an actual speed of the user force input element and a virtual speed. The virtual speed could for example be a constant fixed cadence chosen by the user, or it could be a simulated virtual speed, for example the speed of a virtual mechanical flywheel or other mechanical system.

The load reference controller then works on the principle that if the actual pedal speed is higher than the virtual speed, then the load reference will be increased to attempt to slow down the actual pedal speed. If the actual pedal speed is lower than the virtual speed, then the load reference is decreased to attempt to increase the pedal speed again. In this way, when a fast controller is used, the user will experience an essentially constant speed of the pedals and the load will be automatically adjusted to be sinusoidal like. This control effect happens throughout the rotation of the pedals. When the pedals are at their horizontal position, the user will be able to apply a great force and the pedal speed will increase with regards to the virtual speed. This will automatically increase the load force applied by the electrical motor. As the user approaches the lower position, the user will be able to apply less and less force, hence the pedal speed will decrease with regards to the virtual speed and the load force will also decrease. The system will therefore automatically provide a form of sinusoidal load curve.

An extra benefit of this system is that the system will automatically adjust the load reference to fit the user. For example if the user's right leg is slightly stronger than his left left then the system will notice a slightly higher speed on the right pedal and will increase the force respectively, while it will notice a slightly lower speed difference for the left pedal and reduce the load reference accordingly.

This type of control where the control adjustment is made continuously over a single rotation of the user force input element requires a fast control action and a control action which is adjustable over a wide range at a fast rate. This is not possible or not obvious with many of the prior art load control systems available.

In one concrete example, a simple model of a flywheel will be chosen. At the start, the virtual flywheel speed will be zero. As the user applies force to the pedals, the actual speed of the pedals will be greater than zero and the DC motor will apply a high load. At the same time, the model of the virtual flywheel will start to speed up. The speed difference between the pedals and the virtual speed can also be used as an input to the model of the flywheel. The greater the difference, the more the virtual flywheel is accelerated. As the flywheel spins up, the virtual velocity will increase and therefore, if the user maintains the same pedal speed while the virtual velocity is increasing, the load force will decrease over time. Different factors such as air resistance and frictional resistance can be added to the virtual flywheel model to provide a more realistic system.

This principle of load reference control based on speed differences between an actual pedal speed and a virtual speed is described in more detail in U.S. Pat. Nos. 5,256,115 and 7,862,476. These two documents are incorporated by reference in their entirety in this specification.

It should be noted that the current invention is related to the electrical setup of the system which applies the load to the user force input element. The actual load reference controller can take many forms and as such, we do not describe it in detail in this specification. Different algorithms can be used together with the electrical setup of the current invention. Different algorithms will have different advantages and disadvantages. For example, some algorithms will feel smoother than others, while some algorithms might be simpler to implement in control code.

Should the reader of this specification be in doubt as to how to implement a suitable algorithm based on speed differences, the two above mentioned documents provide some example algorithms. It should however be noted that while these two documents provide some examples of suitable control algorithms, other algorithms are possible and more advanced algorithms with additional beneficial properties could be the subject of a future patent application by the applicant.

It is also to be noted that the figures and the above description have shown the example embodiments in a simple and schematic manner. Many of the specific electrical and mechanical details have not been shown since the person skilled in the art should be familiar with these details and they would just unnecessarily complicate this description.

The invention claimed is:

1. An exercise machine comprising:
   a. a user force input element,
   b. a transmission unit,
   c. an electric motor, and
   d. an electrical circuit connected to the electric motor,
   e. said user force input element being connected to the electric motor via the transmission unit such that said electric motor turns at an angular velocity which is different than a velocity or an angular velocity of the user force input element,
   f. said electric motor running as a generator such that when the electric motor is turned, an electrical current is developed in the electrical circuit,
   g. wherein said electrical circuit comprises:
   h. an electrical resistor,
   i. a switching element,
   j. a Pulse Width Modulation (PWM) controller, and
   k. a load reference controller,
   L. said electrical resistor being connected to the electric motor via the switching element such that when the switching element is switched on and off, the electrical resistor is electrically connected and disconnected from the electric motor,
   m. said switching element being controlled via the PWM controller to change a time the resistor is connected to the electric motor,
   n. the PWM controller having a switching frequency greater than or equal to 200 Hz and in that
   o. the load reference controller controls the PWM controller by sending a load reference to the PWM controller, said load reference controller having a sampling frequency of greater than or equal to 200 Hz.

2. The exercise machine according to claim 1, wherein the load reference controller calculates the load reference based on a velocity difference between a measured velocity of the user force input element and a virtual velocity.

3. The exercise machine according to claim 2, wherein the virtual velocity is calculated based on a function of the measured velocity of the user force input element.

4. The exercise machine according to claim 2, wherein the virtual velocity is based on a model of a virtual inertial flywheel or another virtual system comprising an inertial load.

5. The exercise machine according to claim 4, wherein the virtual velocity takes into account virtual frictional type loads.

6. The exercise machine according to claim 1, wherein the user force input element has a circular motion and in that the angular velocity of the electric motor is greater than the angular velocity of the user force input element due to a gearing in the transmission unit.

7. The exercise machine according to claim 6, wherein the exercise machine is an exercise bike and the user force input element is a set of pedals.

8. The exercise machine according to claim 1, wherein the load reference controller generates a load reference based at least in part on an actual force applied to the user force input element.

9. The exercise machine according to claim 8, wherein the actual applied force is estimated based on a known load exerted by the electric motor and the change in velocity of a rotating shaft of the electric motor.

10. The exercise machine according to claim 1, wherein said electric motor is a DC motor.

11. The exercise machine according to claim 1, wherein the user force input element includes a set of bicycle pedals.

* * * * *